Aug. 2, 1932.     A. A. KINARD     1,869,756
COOLING JACKET FOR MILK AND OTHER CANS
Filed Sept. 16, 1930     2 Sheets-Sheet 1
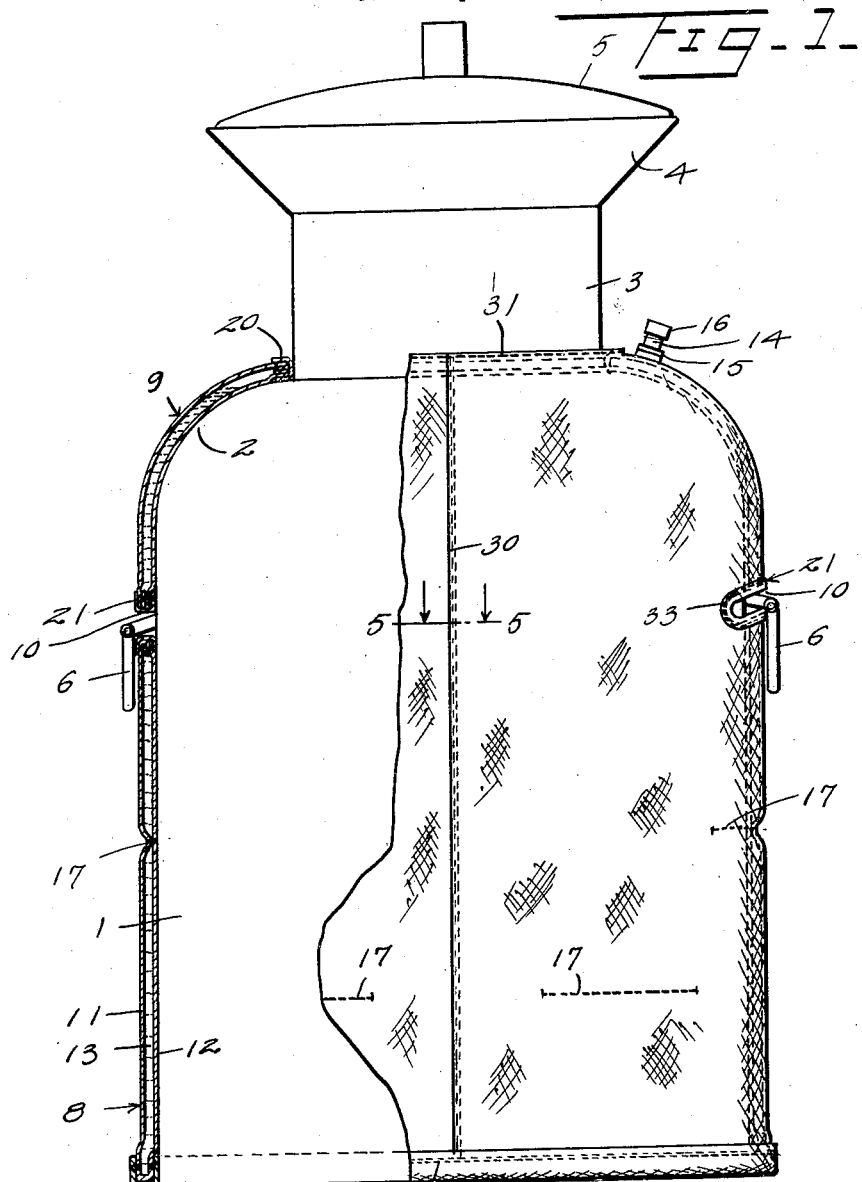
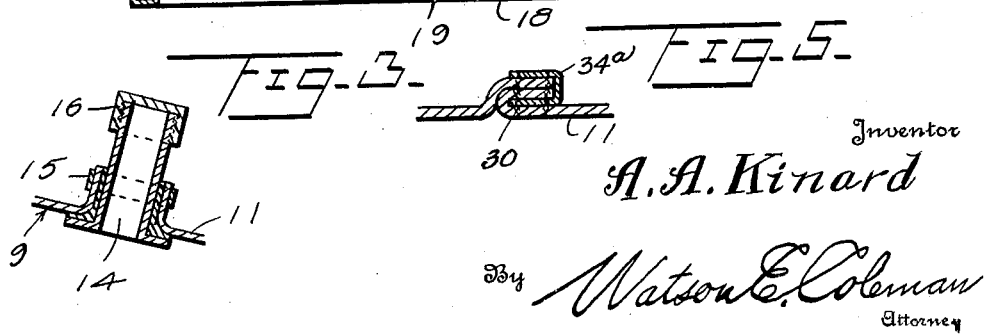
Inventor
A. A. Kinard
By Watson E. Coleman
Attorney Aug. 2, 1932.   A. A. KINARD   1,869,756
COOLING JACKET FOR MILK AND OTHER CANS
Filed Sept. 16, 1930   2 Sheets-Sheet 2
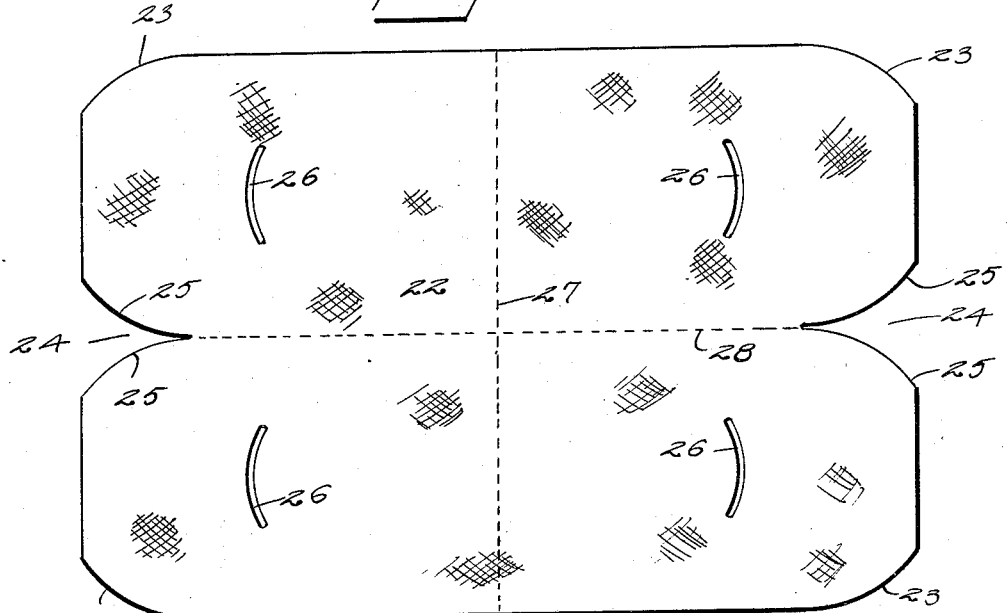
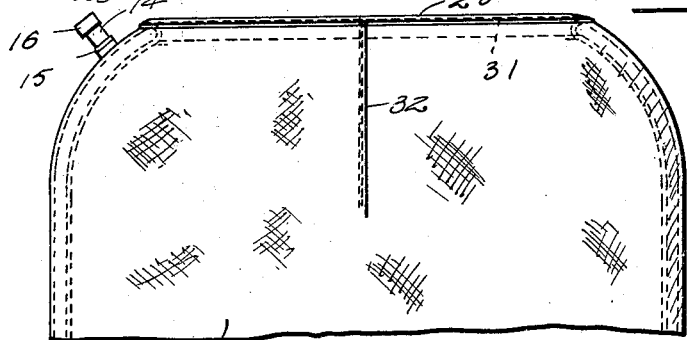
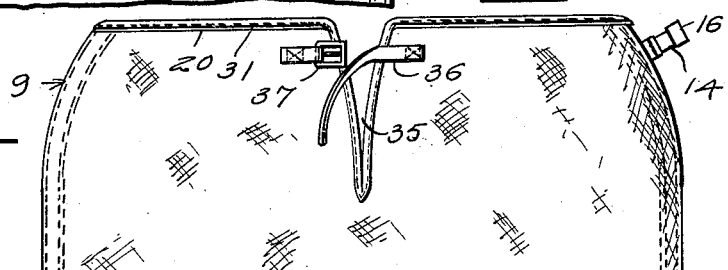
Inventor
A. A. Kinard
By Watson E. Coleman
Attorney Patented Aug. 2, 1932

1,869,756

UNITED STATES PATENT OFFICE

ALMAN A. KINARD, OF MEMPHIS, TEXAS

COOLING JACKET FOR MILK AND OTHER CANS

Application filed September 16, 1930. Serial No. 482,302.

This invention relates to a jacket for liquid containers generally, and more particularly to a jacket for milk cans.

The invention has for one of its objects to provide a novel, simple and inexpensive jacket of the character stated which shall be adapted to be used in warm weather for the purpose of preventing sweet milk from souring while being hauled short distances to refrigerating plants, for the purpose of maintaining the quality of sour cream at cream buying stations and in transit to creameries, and for the purpose of preventing the "boiling" of cream and thus enable the creameries to make high average scoring butter.

To attain the foregoing and other objects, the invention comprehends the provision of a jacket which shall be adapted to surround the body of a milk can, which shall have a chamber similar in configuration to the body of the milk can and adapted to contain water, and which shall be made of material through which the water may gradually seep so as to maintain upon the outer surfaces of the chamber a film of water which in evaporating will maintain the contents of the can at a low temperature.

The invention is hereinafter more fully described and claimed, and illustrated in the accompanying drawings, wherein:—

Figure 1 is a view partly in side elevation and partly in vertical section illustrating the application of the cooling jacket to a milk can.

Figure 2 is a view in side elevation of the upper portion of the cooling jacket.

Figure 3 is a sectional view taken on a plane extending centrally and longitudinally through the filler nozzle of the cooling jacket.

Figure 4 is a sectional view taken on a plane extending transversely through one of the seams of the cooling jacket.

Figure 5 is a sectional view taken on the plane indicated by the line 5—5 of Figure 1.

Figure 6 is a plan view of the blank from which the cooling jacket is made; and

Figure 7 is a view in side elevation of the upper portion of a slightly modified form of the cooling jacket.

Referring in detail to the drawings, 1 designates the body, 2 the shoulder, 3 the neck, 4 the flange, 5 the lid and 6 the handles of a milk can of the usual construction.

The jacket comprises a cylindrical lower portion or body 8 which surrounds the body 1 of the milk can, and an upwardly and inwardly curved upper portion or shoulder 9 which surrounds the shoulder 2 of the milk can. The body 8 is provided at diametrically opposite points with openings 10 through which extend the handles 6 of the milk can. The body 8 and shoulder 9 have inner and outer walls 11 and 12, respectively, which are similar in contour to the body and shoulder and are connected at their upper and lower edges to provide a water chamber 13 which surrounds the body 1 and shoulder 2 of the milk can. A nipple 14 which is carried by the shoulder 9 and is secured to the wall 11, as at 15, communicates with the chamber 13 to permit the chamber to be filled with water. The filler nipple 14 is provided with a cap 16 screw threadedly engaged therewith.

The walls 11 and 12 are connected together at intervals by lines of stitching 17 in order to prevent them and particularly the outer wall 11 from bulging under the weight of the water in the chamber 13. An annular reinforcing member 18 of U-formation in cross section is arranged upon the lower edge of the body 8, and is secured to the walls 11 and 12, as at 19. The reinforcing member 18 may be made of leather, metal or the like. Similar reinforcing members 20 and 21 are applied to the upper edge of the shoulder 9 and to the edges of the openings 10, respectively, and they are secured in place similarly to the manner in which the reinforcing member 18 is secured in place.

The jacket is preferably made from a single blank of duck of such weight and weave as to permit the water in the chamber 13 to gradually seep through the walls 11 and 12. As shown in Figure 6, the blank 22 consists of a single piece of duck of substantially elongated rectangular formation and provided with curved corners 23, notches 24 having curved walls 25 and located in the ends of the blank centrally between the corners 23, and arcuate slots 26. In forming the jacket, the blank 22 is folded along its transverse center, and is thereafter again folded along its longitudinal center, such centers being indicated by the dotted lines 27 and 28. The side edges of the inner portions of the folded blank are stitched together, and the side edges of the outer portions of the folded blank are stitched together. The manner in which these edges are stitched together is shown at 30 in Figure 1. The upper edges of the inner and outer portions of the folded blank and the edges of the notches 25 are stitched together, as shown at 31 and 32, respectively, in Figure 2. The inner and outer portions of the folded blank are stitched together along the edges of the slots 26, as at 33. One of the seams thus formed is shown in Figure 3, and as shown in this figure, the seams are rendered water-proof by a caulking 34 which may be made from felt, leather, rubber or the like. As shown in this figure, the caulking 34 of each seam is of channel formation and receives the inturned ends of the same, the stitching passing through the caulking and said ends. Each of the other seams of the jacket may be rendered waterproof by caulking similar to the caulking 34, one of the other seams being shown in Figure 5 wherein the caulking is designated 34a.

Instead of seaming the jacket, as at 32, to provide the shoulder 9, the jacket may be provided at opposite sides thereof with notches 35 which are of V-form and open out through the upper edge of the shoulder 9. The walls 11 and 12 are seamed at these notches and the seams are made water-proof in the manner in which the other seams are water-proofed. The notches 35 permit the shoulder 9 to be moved into contact with the shoulder 2 of the milk can by drawing together those portions of the shoulder located at opposite sides of the notches, and this may be done by straps 36 and buckles 37 secured to the shoulder at opposite sides of the notches.

In practice, the jacket is applied to a milk can, and thereafter its chamber 13 is filled with water. While the can is being hauled to a refrigerating plant or while it is at a creamery buying station or while it is being hauled to a creamery, the water will seep through the walls 11 and 12 of the chamber 13, with the result that the film of water is maintained upon the outer surface of these walls. The evaporation of the film of water will maintain the contents of the can at a low temperature, with the result that sweet milk will not sour, the quality of sour cream will be maintained, and sweet cream will be prevented from "boiling."

While the jacket is illustrated and described as applied to a milk can, it is to be understood that it may be applied to liquid containers generally. While I have described the principle of the invention, together with the structure which I now consider the preferred embodiment thereof, it is to be understood that the structure shown is merely illustrative and that such changes may be made, when desired, as fall within the scope of the invention as claimed.

I claim:—

1. A cooling jacket for a receptacle, comprising a body portion adapted to be applied to the receptacle and having inner and outer walls providing therebetween a water chamber and made of porous material to permit the water in the chamber to seep therethrough for evaporation on the outer surface thereof, a filler nipple carried by the jacket and communicating with the water chamber thereof, and a removable closure for the filler nipple.

2. A cooling jacket for a receptacle, comprising inner and outer walls formed integrally at their lower edges and having side and upper edges turned inwardly and stitched together, said walls being provided with openings having their edges turned inwardly and stitched together, said walls providing therebetween a water chamber and made of porous material to permit the water in the chamber to seep therethrough for evaporation on the outer surfaces thereof, and channeled caulking strips receiving said inturned edges and secured thereto by said stitching.

In testimony whereof I hereunto affix my signature.

ALMAN A. KINARD.